(12) United States Patent
Mummareddi et al.

(10) Patent No.: US 12,020,275 B2
(45) Date of Patent: Jun. 25, 2024

(54) METHOD AND SYSTEM FOR OFFER TARGETING

(71) Applicant: JPMorgan Chase Bank, N.A., New York, NY (US)

(72) Inventors: Pavan Mummareddi, Newark, DE (US); David Christopher Carey, Middletown, DE (US); Michael Polise, Philadelphia, PA (US); Ruchi Ashok Saini, Garnet Valley, PA (US); Jason M. Deitcher, Wilmington, DE (US); Sudheendra Ayyalasomayajula, Coatesville, PA (US); Kiana Harris, Chambersburg, PA (US); Marc Frattarelli, Glen Mills, PA (US); Daniel Kim, Fulton, MD (US); Joshua Rosenthal, Airmont, NY (US); Brandon Tran, Philadelphia, PA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 41 days.

(21) Appl. No.: 17/005,995

(22) Filed: Aug. 28, 2020

(65) Prior Publication Data
US 2021/0073848 A1   Mar. 11, 2021

Related U.S. Application Data

(60) Provisional application No. 62/896,173, filed on Sep. 5, 2019.

(51) Int. Cl.
*G06Q 30/02* (2023.01)
*G06Q 30/0207* (2023.01)
*G06Q 30/0238* (2023.01)

(52) U.S. Cl.
CPC ..... *G06Q 30/0224* (2013.01); *G06Q 30/0212* (2013.01); *G06Q 30/0215* (2013.01); *G06Q 30/0238* (2013.01); *G06Q 30/0239* (2013.01)

(58) Field of Classification Search
CPC ...................................................... G06Q 30/02
(Continued)

(56) References Cited

U.S. PATENT DOCUMENTS

| 6,925,441 | B1* | 8/2005 | Jones, III | G06Q 10/06375 |
| | | | | 705/7.33 |
| 7,890,505 | B1* | 2/2011 | Alspector | G06Q 30/0255 |
| | | | | 706/45 |

(Continued)

OTHER PUBLICATIONS

Facebook Turns On "Bandwidth Targeting" To Match Mobile Ads To Your Network Quality | TechCrunch (Year: 2014).*

(Continued)

*Primary Examiner* — Afaf Osman Bilal Ahmed
(74) *Attorney, Agent, or Firm* — GREENBLUM & BERNSTEIN, P.L.C.

(57) ABSTRACT

A method for providing an offer to a potential recipient is provided. The method includes obtaining first information, such as demographic information and/or shopping history information, that relates to the potential recipient; assigning a respective value to each of a plurality of first parameters based on the first information; assigning a respective value to each of a plurality of second parameters based on second information that relates to the offer; determining a composite score based on the assigned first parameter values and the assigned second parameter values; and determining, based on the composite score, whether to provide the offer to the potential recipient.

10 Claims, 5 Drawing Sheets

(58) Field of Classification Search
USPC .......................................................... 705/14.1
See application file for complete search history.

(56) References Cited

U.S. PATENT DOCUMENTS

| | | | |
|---|---|---|---|
| 2016/0071107 A1* | 3/2016 | Van .......................... | G06F 21/00 |
| | | | 705/44 |
| 2019/0164082 A1* | 5/2019 | Wu ........................... | G06N 20/00 |
| 2020/0202317 A1* | 6/2020 | Cassel ...................... | G06F 16/93 |

OTHER PUBLICATIONS

Facebook Turns On "Bandwidth Targeting" To Match Mobile Ads To Your Network Quality | TechCrunch (Year: 2014) (Year: 2014).*

* cited by examiner

METHOD AND SYSTEM FOR OFFER TARGETING

CROSS-REFERENCE TO RELATED APPLICATIONS

This application claims the benefit of U.S. Provisional Patent Application Ser. No. 62/896,173, filed Sep. 5, 2019, which is hereby incorporated by reference in its entirety.

BACKGROUND

1. Field of the Disclosure

This technology generally relates to methods and systems for offer targeting, and more particularly to methods and systems for providing targeted offers for digital wallet products based on customer demographics and transaction history 2. Background Information Many business entities provide offers to potential customers by using traditional advertisement techniques, such as direct mail advertising, electronic mail advertising, broadcast media advertising, or any other means for advertising. Historically, such forms of advertising have resulted in varying degrees of success with respect to generating customer sales and revenues.

One drawback of using conventional forms of advertising is that in many instances, the offers being advertised are directed to a general audience of recipients, and many such recipients have no interest in the product being advertised. As a result, the return on investment may be relatively low. In addition, some potential customers are more likely than others to use the Internet and/or electronic devices and mechanisms, such as computers, mobile smart phones, and digital wallets, to engage in a transaction.

Therefore, there is a need to determine whether a potential customer is likely to be interested in a particular product and/or to make use of a digital wallet for a particular transaction, and to target offers to potential customers that have been identified as such.

SUMMARY

The present disclosure, through one or more of its various aspects, embodiments, and/or specific features or sub-components, provides, inter alia, various systems, servers, devices, methods, media, programs, and platforms for providing targeted offers for digital wallet products based on customer demographics and transaction history.

According to an aspect of the present disclosure, a method for providing an offer for a proposed transaction to a potential recipient is provided. The method is implemented by at least one processor. The method includes: obtaining first information that relates to the potential recipient; assigning a respective value to each of a plurality of first parameters based on the first information; assigning a respective value to each of a plurality of second parameters based on second information that relates to the offer for the proposed transaction; determining a composite score based on the assigned first parameter values and the assigned second parameter values; and determining, based on the composite score, whether to provide the offer to the potential recipient.

The determining of the composite score may include applying a first algorithm to each of the plurality of first parameters and to each of the plurality of second parameters. The first algorithm may correspond to at least one from among a logistic regression model, a decision tree model, a support vector machine model, and a clustering model.

The plurality of first parameters may include at least one from among a parameter that relates to an age of the potential recipient, a parameter that relates to a gender of the potential recipient, a parameter that relates to a place of residence of the potential recipient, a parameter that relates to a device type used by the potential recipient, a digital profile parameter that relates to the potential recipient, a financial product type parameter, an account activation duration parameter, and a shopping history parameter.

A value of the parameter that relates to the device type may be based on at least one from among a manufacturer of the device and an operating system employed by the device.

A value of the financial product type parameter may be based on an account type that includes at least one from among a credit card account, a debit card account, a checking account, and a savings account.

A value of the shopping history parameter may be based on at least one from among a number of transactions executed within a predetermined time interval, an average dollar amount of the transactions executed within the predetermined time interval, and a maximum dollar amount of the transactions executed within the predetermined time interval.

The plurality of second parameters may include at least one from among a transaction type parameter, a merchant type parameter, and a merchant digital wallet mechanism parameter.

A value of the transaction type parameter may be based on whether the proposed transaction is an online transaction or a swipe transaction that is to be executed by using a point-of-sale device to swipe a payment card.

The determining of whether to provide the offer for the proposed transaction to the potential recipient may include comparing the composite score with a predetermined threshold value and determining whether to provide the offer based on a result of the comparing.

When a determination to provide the offer for the proposed transaction to the potential recipient is made, the method may further include notifying the potential recipient of the offer by transmitting at least one from among an email message, a text message, and a mobile alert message to the potential recipient.

According to another exemplary embodiment, a computing apparatus for providing an offer for a proposed transaction to a potential recipient is provided. The computing apparatus includes a processor, a memory, and a communication interface coupled to each of the processor and the memory. The processor is configured to: obtain first information that relates to the potential recipient; assign a respective value to each of a plurality of first parameters based on the first information; assign a respective value to each of a plurality of second parameters based on second information that relates to the offer for the proposed transaction; determine a composite score based on the assigned first parameter values and the assigned second parameter values; and determine, based on the composite score, whether to provide the offer for the proposed transaction to the potential recipient.

The processor may be further configured to determine the composite score by applying a first algorithm to each of the plurality of first parameters and to each of the plurality of second parameters. The first algorithm may correspond to at least one from among a logistic regression model, a decision tree model, a support vector machine model, and a clustering model.

The plurality of first parameters may include at least one from among a parameter that relates to an age of the potential recipient, a parameter that relates to a gender of the potential recipient, a parameter that relates to a place of residence of the potential recipient, a parameter that relates to a device type used by the potential recipient, a digital profile parameter that relates to the potential recipient, a financial product type parameter, an account activation duration parameter, and a shopping history parameter.

A value of the parameter that relates to the device type may be based on at least one from among a manufacturer of the device and an operating system employed by the device.

A value of the financial product type parameter may be based on an account type that includes at least one from among a credit card account, a debit card account, a checking account, and a savings account.

A value of the shopping history parameter may be based on at least one from among a number of transactions executed within a predetermined time interval, an average dollar amount of the transactions executed within the predetermined time interval, and a maximum dollar amount of the transactions executed within the predetermined time interval.

The plurality of second parameters may include at least one from among a transaction type parameter, a merchant type parameter, and a merchant digital wallet mechanism parameter.

A value of the transaction type parameter may be based on whether the proposed transaction is an online transaction or a swipe transaction that is to be executed by using a point-of-sale device to swipe a payment card.

The processor may be further configured to determine whether to provide the offer for the proposed transaction to the potential recipient by comparing the composite score with a predetermined threshold value and determining whether to provide the offer based on a result of the comparison.

When a determination to provide the offer for the proposed transaction to the potential recipient is made, the processor may be further configured to notify the potential recipient of the offer by transmitting, via the communication interface, at least one from among an email message, a text message, and a mobile alert message to the potential recipient.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
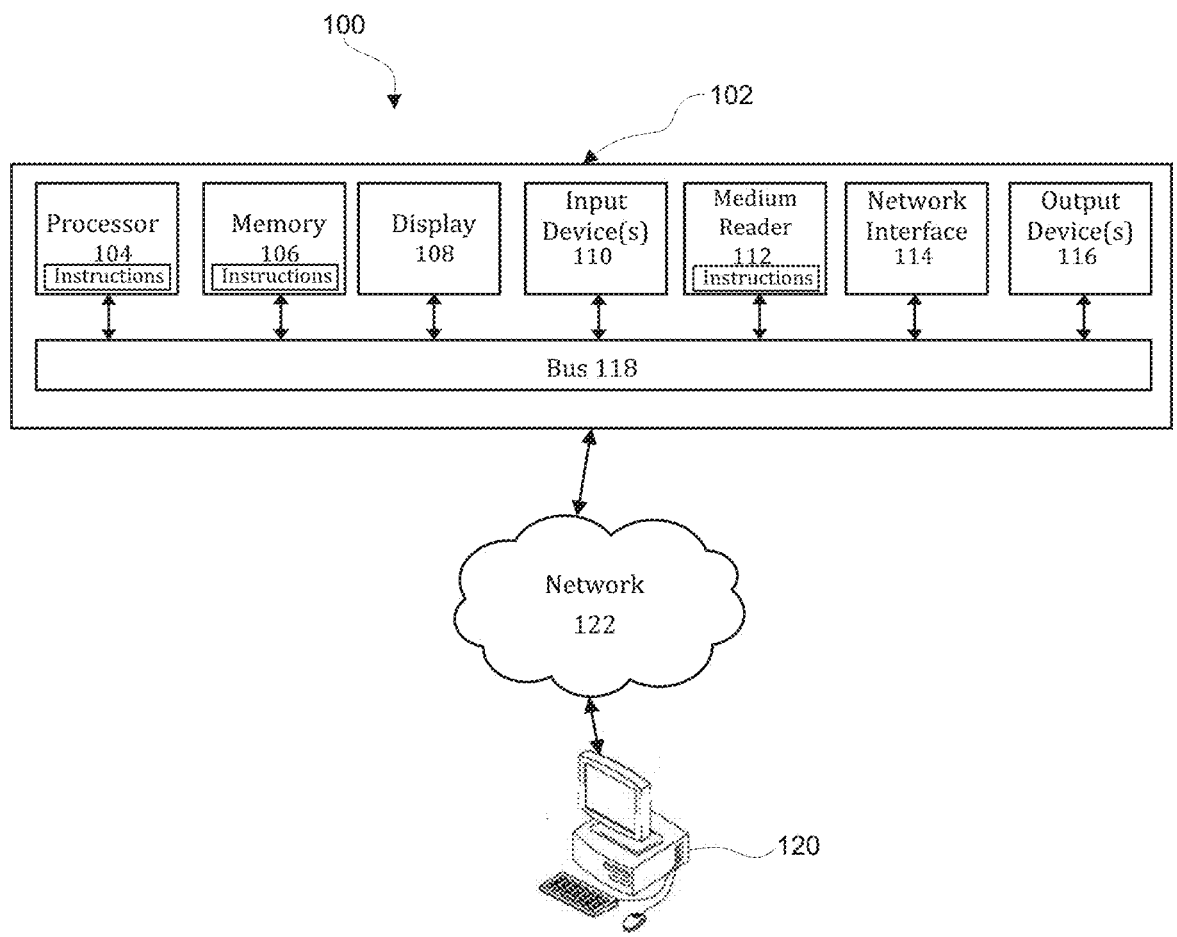
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized methods and systems for providing targeted offers for digital wallet products based on customer demographics and transaction history.

Figure 2:
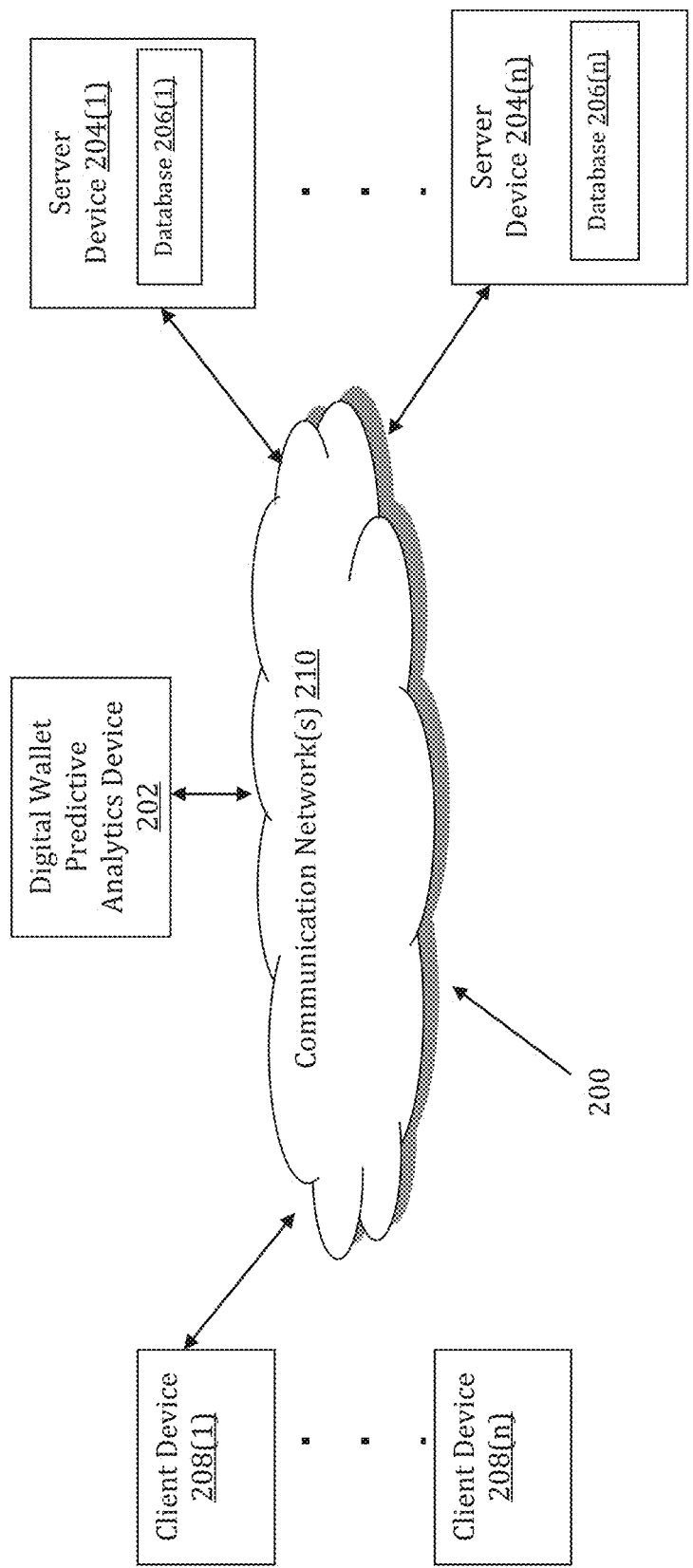
FIG. 2 illustrates an exemplary diagram of a network environment.

Referring to FIG. 2, a schematic of an exemplary network environment 200 for implementing a method for providing targeted offers for digital wallet products based on customer demographics and transaction history is illustrated. In an exemplary embodiment, the method is executable on any networked computer platform, such as, for example, a personal computer (PC).

The method for providing targeted offers for digital wallet products based on customer demographics and transaction history may be implemented by a Digital Wallet Predictive Analytics (DWPA) device 202. The DWPA device 202 may be the same or similar to the computer system 102 as described with respect to FIG. 1. The DWPA device 202 may store one or more applications that can include executable instructions that, when executed by the DWPA device 202, cause the DWPA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DWPA device 202 itself, may be located in virtual server(s) running in a cloud-based computing environment rather than being tied to one or more specific physical network computing devices. Also, the application(s) may be running in one or more virtual machines (VMs) executing on the DWPA device 202. Additionally, in one or more embodiments of this technology, virtual machine(s) running on the DWPA device 202 may be managed or supervised by a hypervisor.

In the network environment 200 of FIG. 2, the DWPA device 202 is coupled to a plurality of server devices 204(1)-204(n) that hosts a plurality of databases 206(1)-206(n), and also to a plurality of client devices 208(1)-208(n) via communication network(s) 210. A communication interface of the DWPA device 202, such as the network interface 114 of the computer system 102 of FIG. 1, operatively couples and communicates between the DWPA device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DWPA device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and DWPA devices that efficiently implement a method for providing targeted offers for digital wallet products based on customer demographics and transaction history.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DWPA device 202 may be a standalone device or integrated with one or more other devices or apparatuses, such as one or more of the server devices 204(1)-204(n), for example. In one particular example, the DWPA device 202 may include or be hosted by one of the server devices 204(1)-204(n), and other arrangements are also possible. Moreover, one or more of the devices of the DWPA device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DWPA device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to customer demographics, customer transaction history, merchants, products, and offers.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the DWPA device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the DWPA device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the DWPA device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DWPA device 202, the server devices 204(1)-204(n), or the client devices 208(1)-208(n), for example, may be configured to operate as virtual instances on the same physical machine. In other words, one or more of the DWPA device 202, the server devices 204(1)-204(n), or the client devices 208(1)-208(n) may operate on the same physical device rather than as separate devices communicating through communication network(s) 210. Additionally, there may be more or fewer DWPA devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
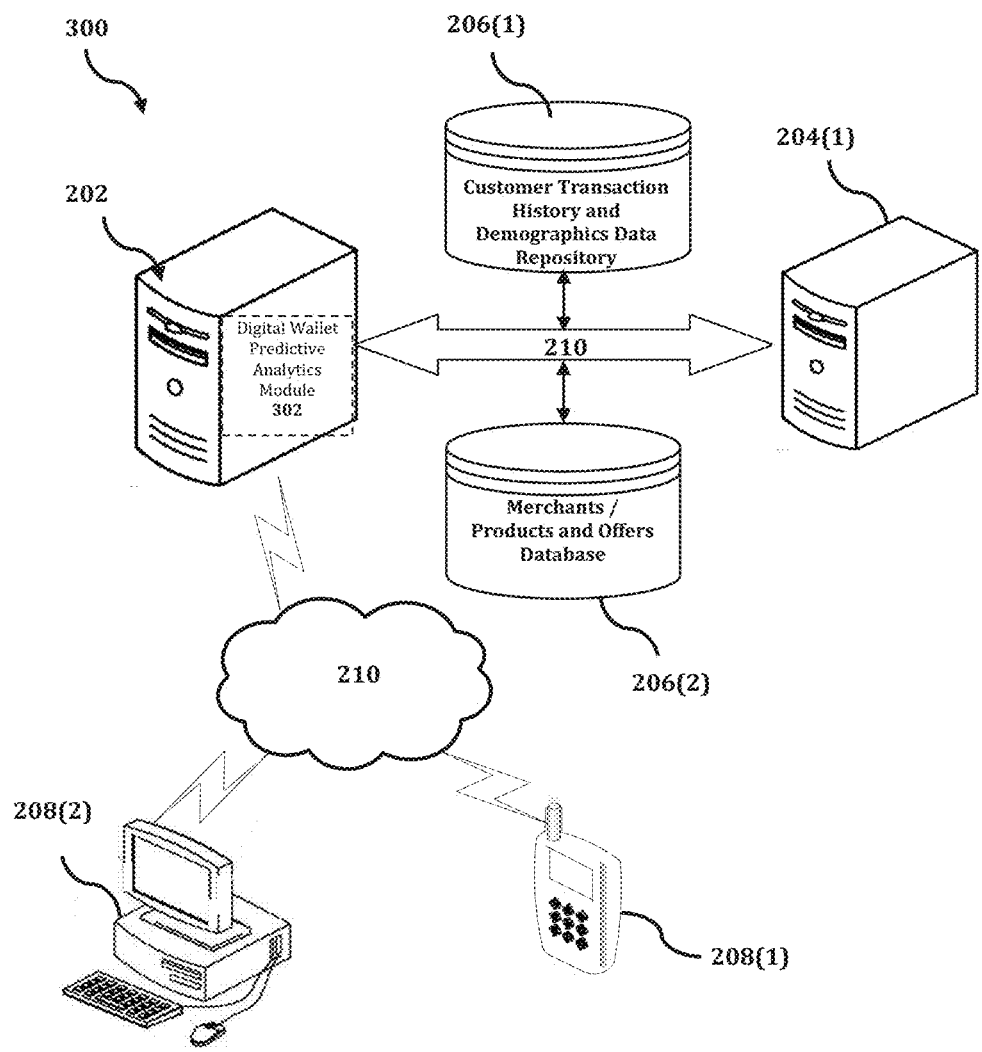
FIG. 3 shows an exemplary system for implementing a method for providing targeted offers for digital wallet products based on customer demographics and transaction history.

The DWPA device 202 is described and shown in FIG. 3 as including a digital wallet predictive analytics module 302, although it may include other rules, policies, modules, databases, or applications, for example. As will be described below, the digital wallet predictive analytics module 302 is configured to implement a method for providing targeted offers for digital wallet products based on customer demographics and transaction history.

An exemplary process 300 for implementing a mechanism for providing targeted offers for digital wallet products based on customer demographics and transaction history by utilizing the network environment of FIG. 2 is shown as being executed in FIG. 3. Specifically, a first client device 208(1) and a second client device 208(2) are illustrated as being in communication with DWPA device 202. In this regard, the first client device 208(1) and the second client device 208(2) may be "clients" of the DWPA device 202 and are described herein as such. Nevertheless, it is to be known and understood that the first client device 208(1) and/or the second client device 208(2) need not necessarily be "clients" of the DWPA device 202, or any entity described in association therewith herein. Any additional or alternative relationship may exist between either or both of the first client device 208(1) and the second client device 208(2) and the DWPA device 202, or no relationship may exist.

Further, DWPA device 202 is illustrated as being able to access a customer transaction history and demographics data repository 206(1) and a merchants/products and offers database 206(2). The digital wallet predictive analytics module 302 may be configured to access these databases for implementing a method for providing targeted offers for digital wallet products based on customer demographics and transaction history.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the DWPA device 202 via broadband or cellular communication. Of course, these embodiments are merely exemplary and are not limiting or exhaustive.

Upon being started, the digital wallet predictive analytics module 302 executes a process for providing targeted offers for digital wallet products based on customer demographics and transaction history. An exemplary process for providing targeted offers for digital wallet products based on customer demographics and transaction history is generally indicated at flowchart 400 in FIG. 4.

Figure 4:
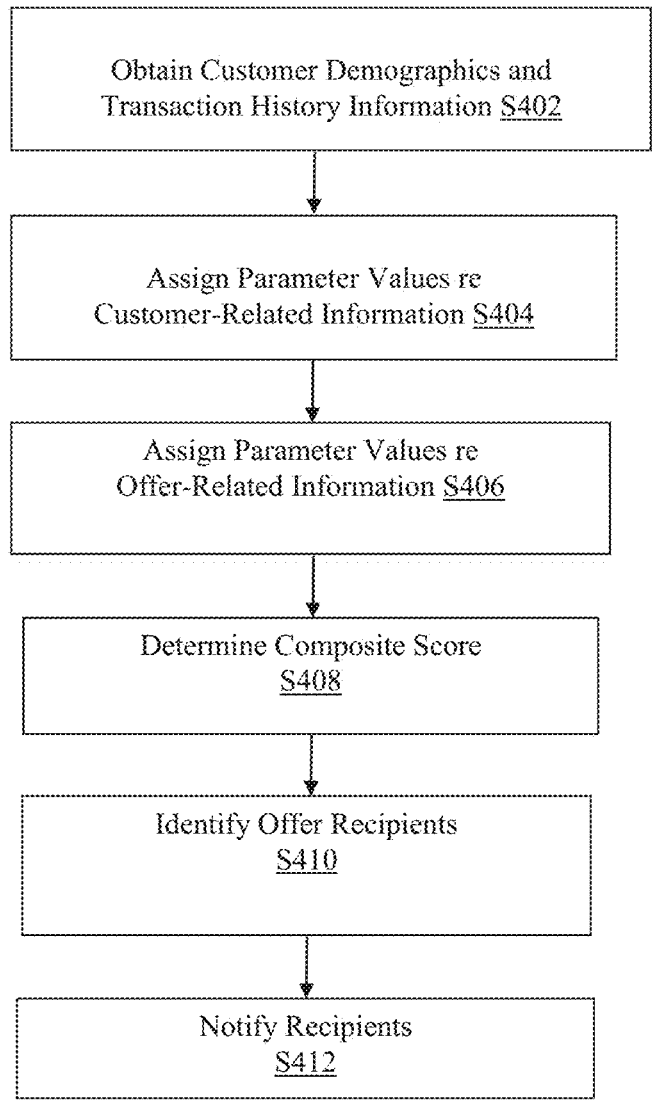
FIG. 4 is a flowchart of an exemplary process for implementing a method for providing targeted offers for digital wallet products based on customer demographics and transaction history.

In the process 400 of FIG. 4, at step S402, customer demographics data and transaction history information is obtained. In an exemplary embodiment, the customer demographics data may include any one or more of an age of a customer, a gender of a customer, and/or a place of residence of a customer. In an exemplary embodiment, the transaction history information may include any one or more of a device type that relates to a customer and one or more transactions, a digital profile that relates to a customer and one or more transactions, a financial product type (i.e., credit or debit) that relates to a customer and one or more transactions, an account activation duration, and a shopping history of a customer.

At step S404, the customer demographics data and transaction history information is used for assigning a first set of parameter values to be used subsequently for predictive analysis with respect the customer. In an exemplary embodiment, when the obtained information indicates that a customer has a digital profile, a digital profile parameter may be assigned a value of 75%, whereas when the obtained information indicates that the customer does not have a digital profile, the digital profile parameter may be assigned a value of 50%.

In an exemplary embodiment, when the obtained information indicates that a financial product type is a credit type, a financial product type parameter may be assigned a value of 100%, whereas when the obtained information indicates that the financial product type is a debit type, the financial product type parameter may be assigned a value of 0%. For example, the financial product type may include any one or more of a credit card account, a debit card account, a checking account, a savings account, and/or any other suitable type of financial account.

In an exemplary embodiment, when the obtained information indicates that a device type indicates a manufacturer of the device, such as, for example, an Apple device, a device type parameter may be assigned a value of 90%. When the obtained information indicates that the device type indicates a Samsung device, the device type parameter may be assigned a value of 60%. When the obtained information indicates that the device type indicates an operating system employed by the device, such as, for example, an Android device, the device type parameter may be assigned a value of 30%.

In an exemplary embodiment, when the obtained information indicates that a customer resides in any of a first group of states, a place of residence parameter may be assigned a value that effectively increases the score for that customer by 25%, whereas when the obtained information indicates that the customer does not reside in one of those states, the place of residence parameter may be assigned a value that causes the score for that customer to be unaffected.

In an exemplary embodiment, when the obtained information indicates that a customer account has been open for 30 days or less, an account activation duration parameter may be assigned a value of 90%. When the obtained information indicates that the customer account has been open for 31-60 days, the account activation duration parameter may be assigned a value of 60%. When the obtained information indicates that the customer account has been open for at least 61 days, the account activation duration parameter may be assigned a value of 30%.

In an exemplary embodiment, a value of the shopping history parameter may be based on any one or more of a number of transactions executed within a predetermined time interval, such as, for example, the last month, the last quarter, the last six months, or the last year; an average dollar amount of the transactions executed within the predetermined time interval; and/or a maximum dollar amount of the transactions executed within the predetermined time interval.

At step S406, a second set of parameter values that relate to an offer are assigned. In an exemplary embodiment, the second set of parameters may include a parameter that relates to a transaction type (i.e., online or swipe), a parameter that relates to a merchant type, and parameter that relates to a merchant digital wallet mechanism (i.e., whether a particular merchant supports the use of a digital wallet for executing transactions). In an exemplary embodiment, when the obtained information indicates that a transaction type is an online transaction, a transaction type parameter may be assigned a value of 75%, whereas when the obtained information indicates that the transaction type is a swipe transaction, i.e., a transaction that is to be executed by using a point-of-sale device to swipe a payment card, the transaction type parameter may be assigned a value of 500/0.

At step S408, the first set of parameter values and the second set of parameter values are used to determine a composite score that reflects a probability that a particular customer is deemed to be likely to use a digital wallet with respect to a particular merchant and/or a particular offer. In an exemplary embodiment, the determination of the composite score may be performed by applying an algorithm to each of the first parameters and each of the second parameters. For example, a logistic regression model may be used to identify a suitable algorithm for determining the composite score, and each of the first parameters and each of the second parameters may be used as an input to the identified algorithm. Alternatively, the algorithm may corresponds to any one or more of a decision tree model, a support vector machine model, and a clustering model.

Then, at step S410, the composite score is used for determining whether to target a customer with an offer and identifying a resultant list of customers as recipients of the offer. In an exemplary embodiment, the composite score may be normalized so as to fall within a predetermined range, such as, for example, zero to one hundred (i.e., 0-100); and a threshold score may be used as a decision criterion. Thus for example, a threshold score may be set as 70, such that if a score for a particular customer is greater than or equal to 70, then the digital wallet predictive analytics module 302 may determine that the particular customer is to be targeted with a particular offer.

At step S412, the identified recipients are notified of the offer. In an exemplary embodiment, the offer notification may be performed by transmitting an email message, a text message, and/or a mobile alert to each of the targeted customers. However, any suitable means of notification may be employed.

Figure 5:
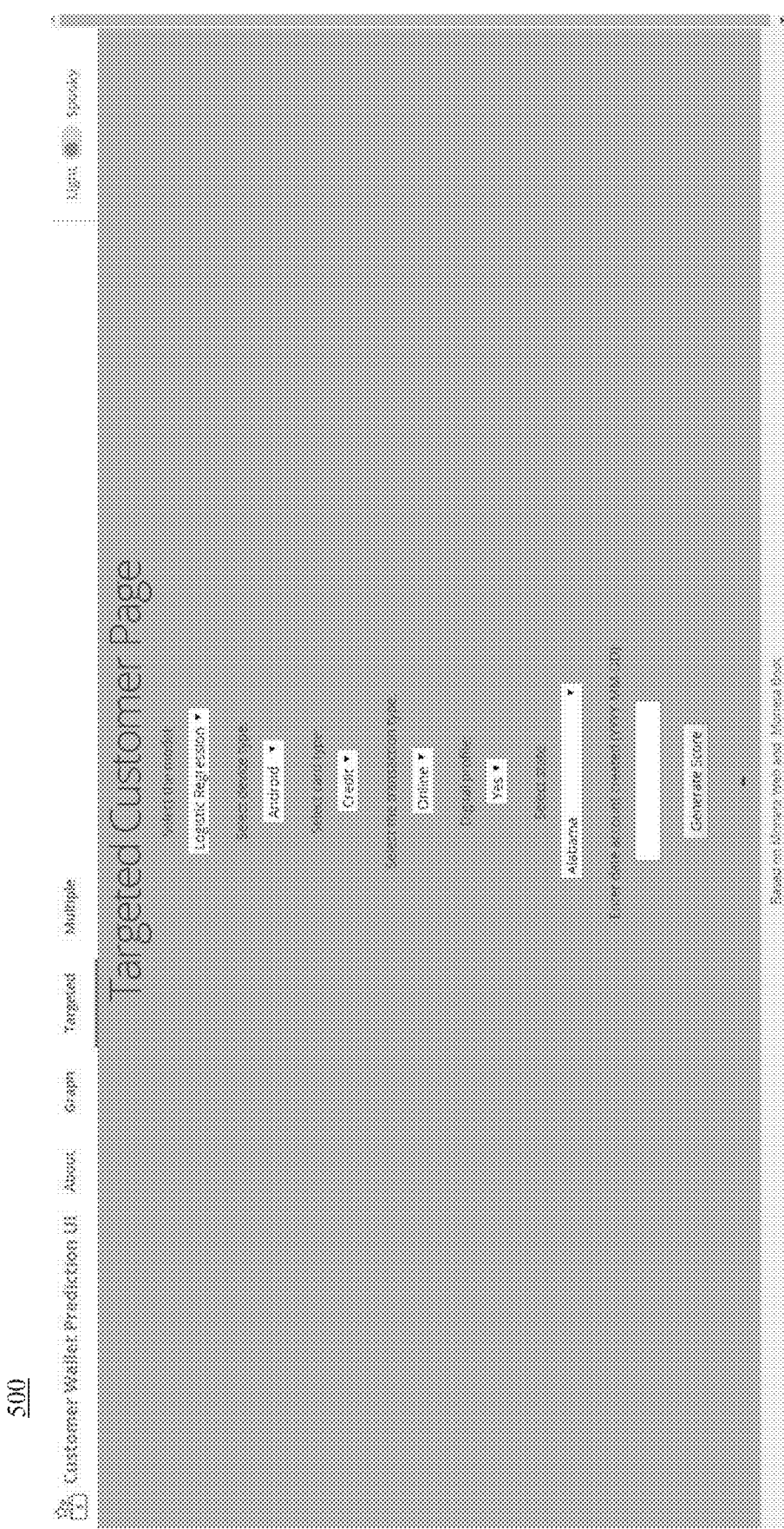
FIG. 5 is a screen shot that illustrates a graphical user interface that is usable for implementing a method for providing targeted offers for digital wallet products based on customer demographics and transaction history, according to an exemplary embodiment.

FIG. 5 is a screen shot that illustrates a graphical user interface that is usable for implementing a method for providing targeted offers for digital wallet products based on customer demographics and transaction history, according to an exemplary embodiment. The graphical user interface shown in FIG. 5 has a header "Targeted Customer Page" and a set of prompts that enable a user to enter information that relates to a customer and customer transaction history.

As illustrated in FIG. 5, a first prompt requests that the user "select the model", i.e., choose an algorithmic model that will be used to generate a composite score for the customer based on the entered data. In an exemplary embodiment, a default entry of "logistic regression" is shown, and a downward arrow at the right side of the data entry box indicates that a drop-down menu of selectable algorithmic models would be shown when the user clicks on the data entry box. The drop-down menu may include various types of algorithmic models in addition to the logistic regression model, such as, for example, a decision tree model, a support vector machine model, and/or a clustering model.

A second prompt requests that the user "select [a] device type", and the default entry is shown as "Android". For the second prompt, a downward arrow at the right side of the data entry box indicates that a drop-down menu of selectable device types is available.

A third prompt requests that the user "select [a] card type", and the default entry is shown as "Credit". For the third prompt, a downward arrow at the right side of the data entry box indicates that a drop-down menu of selectable card types is available.

A fourth prompt requests that the user "select the transaction type", and the default entry is shown as "Online". For the fourth prompt, a downward arrow at the right side of the data entry box indicates that a drop-down menu of selectable transaction types is available.

A fifth prompt requests that the user indicate whether a "digital profile" is associated with the customer, and the default entry is shown as "Yes". For the fifth prompt, a downward arrow at the right side of the data entry box indicates that a drop-down menu of selectable digital profile indications is available.

A sixth prompt requests that the user "select [a] state", and the default entry is shown as "Alabama". For the sixth prompt, a downward arrow at the right side of the data entry box indicates that a drop-down menu of selectable states is available. In an exemplary embodiment, the drop-down menu of selectable states may include all 50 states of the USA listed in alphabetical order, and may also include non-state entities such as the District of Columbia, Puerto Rico, and the U.S. Virgin Islands, and may also include a list of Canadian provinces.

A seventh prompt requests that the user "enter [a] date account created", and also indicates a format (i.e., "YYYY-MM-DD") for which the date entry is requested. For the seventh prompt, in an exemplary embodiment, there is no available drop-down menu, but instead a request that the user enter the date by typing in the applicable numerical information that corresponds to the date on which the account was created.

At the bottom of the graphical user interface, there is a button labeled "Generate Score". By clicking on this button, the data entered in the boxes shown on the graphical user interface will be used to generate the score that reflects the probability that the customer is deemed to be likely to use a digital wallet with respect to a particular merchant and/or a particular offer.

As discussed above with reference to the first prompt illustrated in FIG. 5, the drop-down menu may include various types of algorithmic models for use in predicting customer wallet sentiments, in accordance with one or more exemplary embodiments, The types of algorithmic models may include, for example, a logistic regression model, a decision tree model, a support vector machine model, and/or a clustering model.

Logistic Regression

In an exemplary embodiment, the logistic regression model is a preferred statistical method for prediction of binary classes, such as, for example, eligibility versus non-eligibility for digital wallets.

Linear Regression Equation: Equation 1:

$$y = \beta_0 + \beta_1 X_1 + \beta_2 X_2 + \ldots + \beta_n X_n$$

where y is a dependent variable and X1, X2 . . . and Xn are explanatory variables.

Sigmoid Function: Equation 2:

$$p = 1/1 + e^{-y}$$

The sigmoid function may be applied on linear regression to obtain the following expression for Equation 3:

$$p = 1/1 + e^{-(\beta_0 + \beta_1 X_1 + \beta_2 X_2 \ldots \beta_n X_n)}$$

Logistic regression has several properties, including the following: 1) The dependent variable in logistic regression follows a Bernoulli distribution; 2) estimation is done through maximum likelihood; and 3) No R Square, Model fitness is calculated through Concordance, KS-Statistics.

The sigmoid function, also referred to herein as a logistic function, yields an S-shaped curve that can map any real-valued number into a value between zero (0) and one (1). If the curve goes to positive infinity, then the mapped value of y predicted will become 1, and if the curve goes to negative infinity, then the mapped value of y predicted will become 0. If the output of the sigmoid function is greater than 0.5, then the outcome may be classified as 1 or YES, and if the output of the sigmoid function is less than 0.5, then the outcome may be classified as 0 or NO. For example: If the output is 0.75, then in terms of probability, this may be expressed as follows: There is a 75 percent chance that the user will be enrolled to digital wallets.

Equation 4 below represents another expression of the sigmoid function:

$$f(x) = \frac{1}{1 + e^{-(x)}}$$

Decision Tree

A decision is a tree-like structure where each internal node represents a respective feature, such as, for example, credit/debit, user demographics, payment history, and/or any other suitable feature. The topmost node in the decision tree is known as the root node.

Equation 5 below is an expression that corresponds to a decision tree model:

$$\text{Info}(D) = -\Sigma_{i=1}^{m} p_i \log_2 p_i$$

where pi is the probability that an arbitrary tuple in D belongs to class Ci.

Equations 6 and 7 below are additional expressions that correspond to the decision tree model:

$$\text{Info}_A(D) = \sum_{j=1}^{V} \frac{|D_j|}{|D|} \times \text{Info}(D_j)$$

$$\text{Gain}(A) = \text{Info}(D) - \text{Info}_A(D)$$

where: 1) Info(D) is the average amount of information needed to identify the class label of a tuple in D; 2) |Dj|/|D| acts as the weight of the jth partition; 3) InfoA(D) is the expected information required to classify a tuple from D based on the partitioning by A; and 4) the attribute A with the highest information gain, Gain(A), is chosen as the splitting attribute at node N( ).

Gain Ratio: Information gain is biased for the attribute with many outcomes. This means that the attribute with a relatively large number of distinct values is preferred. For instance, an attribute with a unique identifier, such as customer_ID, has zero info(D) because of pure partition. This maximizes the information gain and creates useless partitioning. Equation 8 below is an expression that corresponds to a component value for determining the gain ratio:

$$SplitInfo_A(D) = -\sum_{j=1}^{v} \frac{|D_j|}{|D|} \times \log_2\left(\frac{|D_j|}{|D|}\right)$$

where 1) |Dj|/|D| acts as the weight of the jth partition; and 2) v is the number of discrete values in attribute A.

Referring to Equation 9 below, the gain ratio may be defined as $$GainRatio(A) = \frac{Gain(A)}{SplitInfo_A(D)}$$

The attribute with the highest gain ratio is chosen as the splitting attribute.

Support Vector Machines (SVM)

Support vectors are data points which are close to a hyperplane. A hyperplane is a decision plane which separates between set of objects having different class memberships.

The SVM algorithm is implemented in practice by using a kernel. A kernel transforms an input data space into the required form. SVM uses a technique referred to as the kernel trick. The kernel trick helps to build a more accurate classifier.

Linear Kernel: A linear kernel may be used as normal dot product of any two given observations. The product between two vectors is the sum of the multiplication of each pair of input values, as expressed in Equation 10 below:

$K(x,xi)=\text{sum}(x*xi)$

Clustering

Clustering is the task of grouping together a set of objects in a way that objects in the same cluster are more similar to each other than to objects in other clusters. In an exemplary embodiment, a clustering algorithm is implemented by performing each of the following: 1) Selecting any two centroids or data points as initial points; 2) after choosing the centroids, each respective data point is assigned to any of the clusters, depending upon the distance between the respective data point and the centroids; 3) for measuring the distances, Equation 11 below expresses the following distance measurement function:

$d=|x2-x1|+|y2-y1|+|z2-z1|$ where d is a distance measurement between two objects, and (x1,y1,z1) and (x2,y2,z2) are the X, Y and Z coordinates of any two objects for which the distance is to be measured.

The clustering algorithm will continue updating cluster centroids (i.e., the coordinates) until it is not possible to further update the cluster centroid coordinates. Equation 12 below is an expression for computing values for updated cluster centroid coordinates:

$$\frac{\sum_{i=1}^{n} x_i}{n}, \frac{\sum_{i=1}^{n} y_i}{n}, \frac{\sum_{i=1}^{n} z_i}{n}$$

where n=a number of objects belonging to that particular cluster.

Accordingly, with this technology, an optimized process for providing targeted offers for digital wallet products based on customer demographics and transaction history is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing an offer for a proposed transaction corresponding to a merchant to a potential recipient, the method being implemented by at least one processor, the method comprising:

obtaining first information that relates to a plurality of potential recipients having a plurality of device types with differing operating systems, the first information including at least a device type and an operating system used by each of the plurality potential recipients;

conducting, via a point-of-sale device at a physical location of the merchant, a purchase transaction by one or more of the potential recipients by performing a magnetic reading of a physical card in response to a swiping operation of the physical card at the point-of-sale device;

obtaining, via the point-of-sale device, a plurality of first parameters corresponding to the purchase transaction in response to the swiping operation, the plurality of first parameters including a merchant type and a presence of digital wallet mechanism providing digital wallet support of the merchant;

assigning a respective value to each of the plurality of first parameters based on the first information, wherein different values are assigned to different potential recipients among the plurality of potential recipients based on the device type and the operating system indicated for each of the different potential recipients;

assigning a respective value to each of a plurality of second parameters based on second information that relates to the offer for the proposed transaction corresponding to the merchant;

determining, for each of the plurality of potential recipients, a composite score based on assigned first parameter values and assigned second parameter values;

for each of the plurality of potential recipients, determining, based on the composite score, whether or not to transmit the offer for the proposed transaction corresponding to the merchant to a device of a respective potential recipient corresponding to the device type and the operating system specified in the first information;

generating the offer for the proposed transaction corresponding to the merchant for the device type and the operating system specified in the first information when the merchant is determined to have the digital wallet mechanism providing the digital wallet support as specified by the plurality of first parameters;

determining not to generate the offer for the proposed transaction corresponding to the merchant for transmission when the merchant is determined not to have the digital wallet mechanism providing the digital wallet support as specified by the plurality of first parameters;

determining, a list of target potential recipients among the plurality of potential recipients based on the device type and the operating system specified in the first information, based on a historical transaction with the merchant, and based on the presence of digital wallet mechanism providing digital wallet support of the merchant, wherein a number of target potential recipients is smaller than a number of the plurality of potential recipients and the target potential recipients corresponding to the device type and the operating system specified in the first information;

transmitting the offer for the proposed transaction corresponding to the merchant, over a network, to only respective devices of the target potential recipients among the plurality of potential recipients when the merchant is determined to have the digital wallet mechanism providing the digital wallet support as specified by the plurality of first parameters; and withholding transmission of the offer for the proposed transaction corresponding to the merchant to devices other than the devices of the target potential recipients among the plurality of potential recipients when the merchant is determined not to have the digital wallet mechanism providing the digital wallet support as specified by the plurality of first parameters, wherein the obtaining of the first information comprises receiving the first information via a graphical user interface,
wherein the determining of the composite score comprises applying a first algorithm to each of the plurality of first parameters and to each of the plurality of second parameters, and
wherein the first algorithm corresponds to a support vector machine model.

2. The method of claim 1, wherein the plurality of first parameters includes at least one from among a parameter that relates to a parameter that relates to a gender of the potential recipient, a parameter that relates to a place of residence of the potential recipient, a digital profile parameter that relates to the potential recipient, and an account activation duration parameter.

3. The method of claim 1, wherein the plurality of second parameters includes at least one from among a merchant type parameter, and a merchant digital wallet mechanism parameter.

4. The method of claim 1, wherein the determining of whether to transmit the offer for the proposed transaction corresponding to the merchant comprises comparing the composite score with a predetermined threshold value and determining whether to provide the offer for the proposed transaction corresponding to the merchant based on a result of the comparing.

5. The method of claim 1, wherein the transmitting is performed using at least one from among a text message, and a mobile alert message to the potential recipient.

6. A computing apparatus for providing an offer for a proposed transaction corresponding to a merchant to a potential recipient, the computing apparatus comprising:
a processor;
a memory; and
a communication interface coupled to each of the processor and the memory,
wherein the processor is configured to:
obtain first information that relates to a plurality of potential recipients having a plurality of device types with differing operating systems by receiving the first information from the plurality of potential recipients via a graphical user interface, the first information including at least a device type and an operating system used by each of the plurality potential recipients;
conduct, via a point-of-sale device at a physical location of the merchant, a purchase transaction by one or more of the potential recipients by performing a magnetic reading of a physical card in response to a swiping operation of the physical card at the point-of-sale device;
obtain, via the point-of-sale device, a plurality of first parameters corresponding to the purchase transaction in response to the swiping operation, the plurality of first parameters including a merchant type and a presence of digital wallet mechanism providing digital wallet support of the merchant;
assign a respective value to each of the plurality of first parameters based on the first information, wherein different values are assigned to different potential recipients among the plurality of potential recipients based on the device type and the operating system indicated for each of the different potential recipients;
assign a respective value to each of a plurality of second parameters based on second information that relates to the offer for the proposed transaction corresponding to the merchant;
determine, for each of the plurality of potential recipients, a composite score based on assigned first parameter values and assigned second parameter values by applying a first algorithm to each of the plurality of first parameters and to each of the plurality of second parameters;
for each of the plurality of potential recipients, determine, based on the composite score, whether or not to transmit the offer for the proposed transaction corresponding to the merchant to a device of a respective potential recipient corresponding to the device type and the operating system specified in the first information;
generate the offer for the proposed transaction corresponding to the merchant for the device type and the operating system specified in the first information when the merchant is determined to have the digital wallet mechanism providing the digital wallet support as specified by the plurality of first parameters;
determine not to generate the offer for the proposed transaction corresponding to the merchant for transmission when the merchant is determined not to have the digital wallet mechanism providing the digital wallet support as specified by the plurality of first parameters;
determine, a list of target potential recipients among the plurality of potential recipients based on the device type and the operating system specified in the first information, based on a historical transaction with the merchant, and based on the presence of digital wallet mechanism providing digital wallet support of the merchant, wherein a number of target potential recipients is smaller than a number of the plurality of potential recipients and the target potential recipients corresponding to the device type and the operating system specified in the first information;
transmit the offer for the proposed transaction corresponding to the merchant, over a network, to only respective devices of the target potential recipients among the plurality of potential recipients when the merchant is determined to have the digital wallet mechanism providing the digital wallet support as specified by the plurality of first parameters; and
withhold transmission of the offer for the proposed transaction corresponding to the merchant to devices other than the devices of the target potential recipients among the plurality of potential recipients when the merchant is determined not to have the digital wallet mechanism providing the digital wallet support as specified by the plurality of first parameters,
wherein the first algorithm corresponds to a support vector machine model.

7. The computing apparatus of claim 6, wherein the plurality of first parameters includes at least one from among a parameter that relates to a parameter that relates to a gender of the potential recipient, a parameter that relates to a place of residence of the potential recipient, a digital profile parameter that relates to the potential recipient, and an account activation duration parameter.

8. The computing apparatus of claim 6, wherein the plurality of second parameters includes at least one from among a merchant type parameter, and a merchant digital wallet mechanism parameter.

9. The computing apparatus of claim 6, wherein the processor is further configured to determine whether to transmit the offer for the proposed transaction corresponding to the merchant by comparing the composite score with a predetermined threshold value and determining whether to provide the offer for the proposed transaction corresponding to the merchant based on a result of the comparison.

10. The computing apparatus of claim 6, wherein the offer for the proposed transaction corresponding to the merchant is transmitted via the communication interface, using at least one from among a text message, and a mobile alert message to the potential recipient.

* * * * *